United States Patent [19]

Bach et al.

[11] Patent Number: 4,894,040
[45] Date of Patent: Jan. 16, 1990

[54] TOY BUILDING ELEMENT WITH ELEMENTS FOR PROVIDING POSITIONAL INFORMATION

[75] Inventors: Erik Bach, Billund; Allan Toft, Vejle, both of Denmark

[73] Assignee: Interlego AG., Switzerland

[21] Appl. No.: 102,145

[22] PCT Filed: Jan. 21, 1987

[86] PCT No.: PCT/DK87/00005
§ 371 Date: Sep. 22, 1987
§ 102(e) Date: Sep. 22, 1987

[87] PCT Pub. No.: WO87/04365
PCT Pub. Date: Jul. 30, 1987

[30] Foreign Application Priority Data

Jan. 22, 1986 [DK] Denmark ................. 325/86

[51] Int. Cl.$^4$ .............. A63H 33/04; A63H 30/00; A63H 33/22; A63H 33/26
[52] U.S. Cl. ................. 446/91; 446/175; 446/219; 446/485; 350/96.1
[58] Field of Search ........ 446/91, 175, 219, 85, 446/455, 467, 484, 485, 217; 350/96.10; 250/227, 236; 180/169

[56] References Cited

U.S. PATENT DOCUMENTS

| 1,734,858 | 11/1929 | Keller | 446/217 X |
|---|---|---|---|
| 2,074,251 | 3/1937 | Braun | 446/175 X |
| 3,237,341 | 3/1966 | Janning | 446/91 |
| 3,354,319 | 11/1967 | Loewen et al. | 250/227 |
| 3,636,317 | 1/1972 | Torrey | 250/227 X |
| 3,809,909 | 5/1974 | Salet et al. | 250/227 X |
| 3,995,169 | 11/1976 | Oddon | 350/96.1 X |
| 4,199,894 | 4/1980 | Fischer | 446/91 |
| 4,242,831 | 1/1981 | O'Shaughnessy | 446/219 |
| 4,250,657 | 2/1981 | Barlow et al. | 446/217 X |
| 4,430,566 | 2/1984 | Searle | 250/227 X |
| 4,479,329 | 10/1984 | Fraden | 446/219 X |
| 4,556,393 | 12/1985 | Bolli | 446/484 X |
| 4,563,162 | 1/1986 | Ishimoto | 446/175 |
| 4,566,032 | 1/1986 | Hirooka et al. | 180/169 X |

FOREIGN PATENT DOCUMENTS

| 123388 | 1/1967 | Denmark . | |
| 2459519 | 6/1979 | France . | |
| 331446 | 12/1970 | Sweden . | |
| 1236988 | 6/1968 | United Kingdom . | |
| 2188956 | 10/1987 | United Kingdom | 446/91 |

Primary Examiner—Robert A. Hafer
Assistant Examiner—D. Neal Muir
Attorney, Agent, or Firm—Kane, Dalsimer, Sullivan, Kurucz, Levy, Eisele and Richard

[57] ABSTRACT

A toy construction set may utilize blocks with electrical connections, this block receives electrical power, outputs energy in the electromagnetic spectrum, receives reflected energy and outputs a result to be utilized elsewhere in the toy assembly. Though it has connectors to attach it to other like blocks, it has a bearing shaft to enable an anemometer (FIG. 5) or a tachometer. It may sense bar codes and enable an assembled vehicle to accept trackway commands.

8 Claims, 3 Drawing Sheets

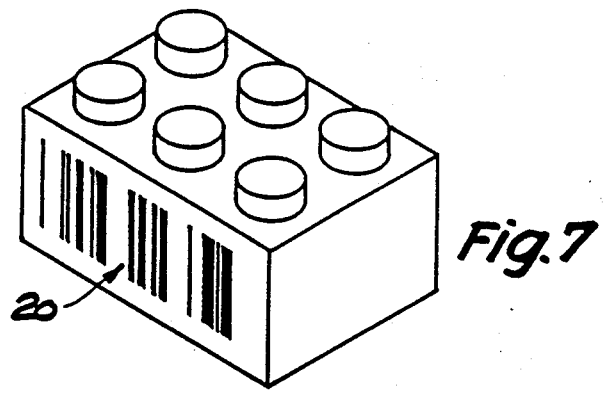
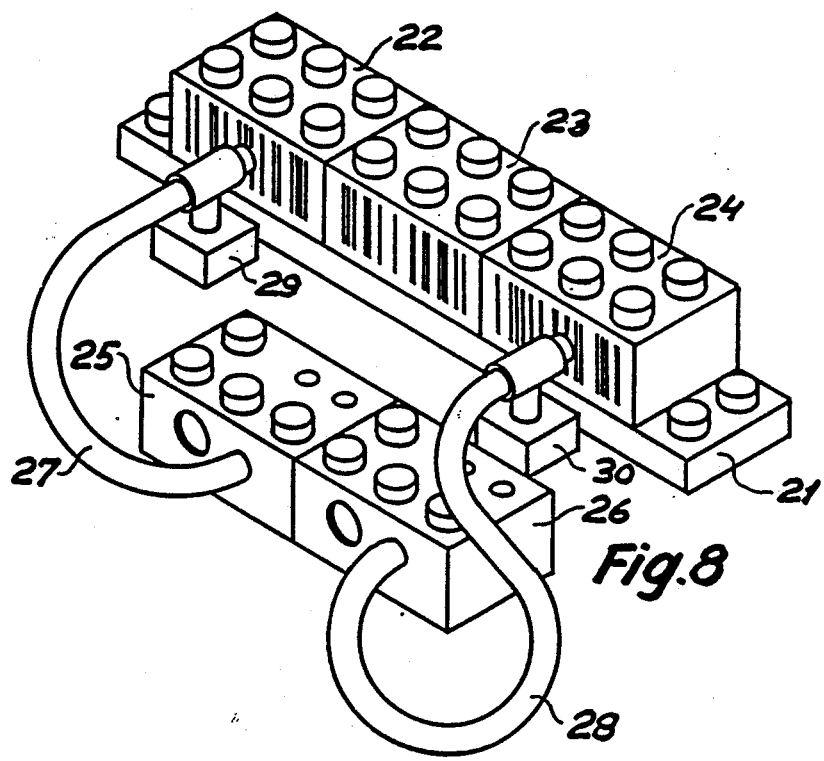

TOY BUILDING ELEMENT WITH ELEMENTS FOR PROVIDING POSITIONAL INFORMATION

BACKGROUND OF THE INVENTION

The invention concerns a toy building set with elements for providing positional information by detection of radiated, reflected energy, such as light.

Associated toy elements are known in the form of a light source and a light detector, respectively, said light detector being adapted to detect the light transmitted from the light source. This prior art provides an information signal by insertion of light absorbing means in the path of the light beam.

The object of the invention is to provide a toy building set with improved means with respect to the prior art for providing positional information.

SUMMARY OF THE INVENTION

This object is achieved in that the toy building set comprises an element of the type defined in the characterizing portion of claim 1. Thus, the invention comprises the use of an integrated electric circuit known per se which both contains a source and a detector, preferably for light, and the special advantages of the invention are obtained by using a detector of this type in a housing which is partly connectible with other elements belonging to the building set and is partly adapted for coupling with various forms of energy reflecting means. Preferably, the circuit is of the type where the transmitted light intensity is automatically increased if the received light signal weakens, which entails that it is sufficient with two leads to the circuit as the circuit will draw a supply current which is dependent upon the light reflection conditions (see e.g. Electronic Design, March 1982, p. 255). It is observed that the energy radiating source and energy receiving detector defined in claim 1 were stated as being a light source and a light receiver above, which is a preferred embodiment and does not prevent the use of something else than ordinary light, such as microwaves.

Claim 2 provides an example of an energy reflecting means for cooperation with the building element of claim 1. The disc may e.g. be a tachometer disc as stated in claim 3. As stated in claim 4, the disc may be provided with wind cups and thus serve as an anemometer.

Claim 5 provides another example of an energy reflecting means in the form of a light conductor which may be coupled mechanically with the building element, so that the region sensitive to detection may be moved away from the immediate vicinity of the building element.

Claim 6 provides another expedient element for the building set of the invention, said element comprising a line code for cooperation with the light detecting element, either directly or indirectly via light conducting means for the type mentioned in claim 4.

The light source may be laser, cf. claim 7, thus making it possible to perform a highly sensitive detection. For example, the oscillations of a membrane can be registered by means of coherent light, and in particular in such a detection it is important that the structure is mechanically stable and geometrically well-defined. When coherent light is used, the variations in the reflective power of the energy reflecting means may be obtained as stated in claim 8.

The mentioned examples, which will be described more fully later, indicate various situations where special advantages are obtained by positioning both the light source and the light receiver in a housing having mechanical coupling means, which involve pre-determined positioning of both the transmitter and the receiver with respect to other energy reflecting building elements of the toy building set.

BRIEF DESCRIPTION OF THE DRAWINGS

The invention will be explained more fully by the following description of some embodiments with reference to the drawing, in which FIGS. 4–7 show various embodiments of energy reflecting means, FIG. 8 schematically shows a use of the toy building set of the invention, FIG. 9 schematically shows another use of the toy building set of the invention, FIGS. 10–12 show in more detail an embodiment of the building, set, seen from below, from the side and from the top, respectively, while

DETAILED DESCRIPTION OF THE PREFERRED EMBODIMENTS

Figure 1:
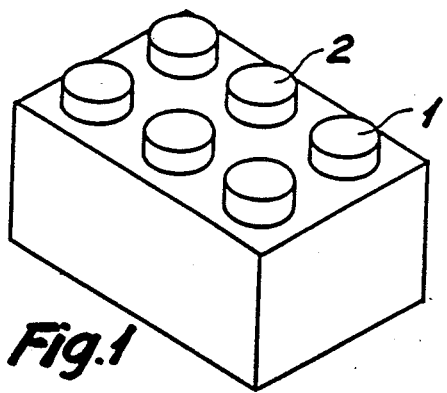
FIG. 1 shows a known element from a toy building set, FIGS. 2 and 3 schematically show the essential parts of an embodiment of the toy building set of the invention.
Figure 10:
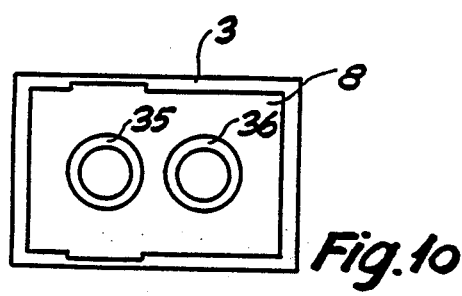

FIG. 1 shows a known building element comprising a hollow body 1 having on its upper side a plurality of coupling studs 2 and on its underside complementary coupling means for connection with the coupling studs on an adjacent element (cf. FIG. 10). The embodiments of the building element of the invention described below are adapted to cooperate with the building element in FIG. 1, but it will be appreciated that the building element of the invention may be arranged to cooperate with other known forms of interconnectible toy elements.

Figure 2:
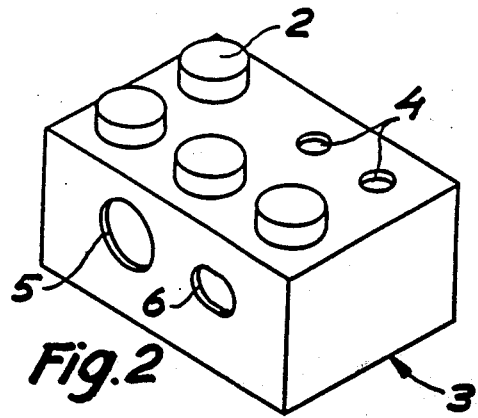
Figure 4:
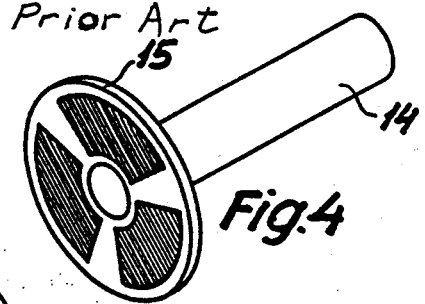
Figure 3:
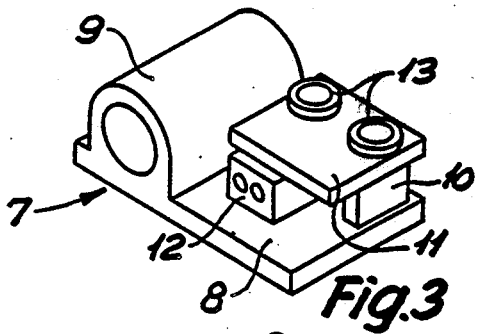

FIGS. 2 and 3 show the main components of an embodiment of the building element of the invention. Thus, FIG. 2 shows a hollow box 3 having four coupling studs 2 on its upper side, two of the coupling studs from FIG. 1 being replaced by a pair of through holes 4 for reception of an electric plug for providing power to the building element of the present invention. Further the housing 3 has two holes, partly a large hole 5 and a small hole 6. FIG. 3 shows an insert generally designated by 7 and comprising a plate 8 whose base is formed with the complementary coupling means mentioned in connection with FIG. 1 (see also FIGS. 10 and 13). The plate 8 is contiguous partly with a bushing 9 and a holder 10 adapted to retain an electric circuit board 11, which, in addition to electronic circuits, comprises a combined light source and light detector 12 as well as two electric coupling bushings 13 for cooperation with the plug pins which can extend through the holes 4 in FIG. 2.

It will be appreciated that the insert 7 may be received in the housing 3 so that the through hole in the bushing 9 is flush with the hole 5 (and an aligned hole in the opposite side of the housing 3), and so that the light element 12 is flush with the hole 6.

Figure 5:
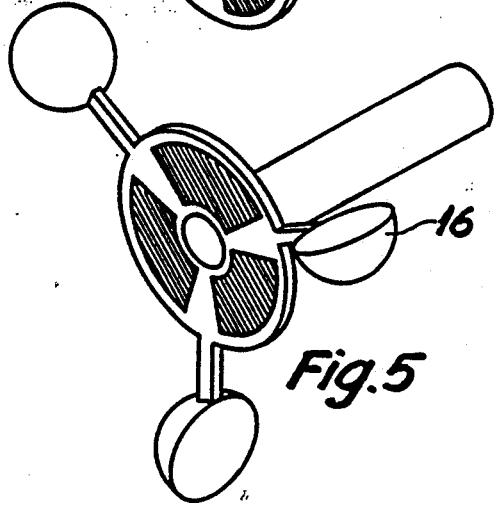

The bushing 9 is adapted to serve as a bearing for a shaft 14 with a disc 15, which is provided with reflecting and non-reflecting sections, respectively, preferably on both sides. Thus, the disc 15 may serve as a tachometer disc so that the rotary speed of the shaft 14 can be detected by means of the light element 12. The element may serve as an ordinary switch by rotation of the disc between two positions in which the reflection properties differ. As shown in FIG. 5, the disc 15 may also be provided with wind cups 16 so that the disc and the cups in combination serve as an anemometer.

Figure 6:
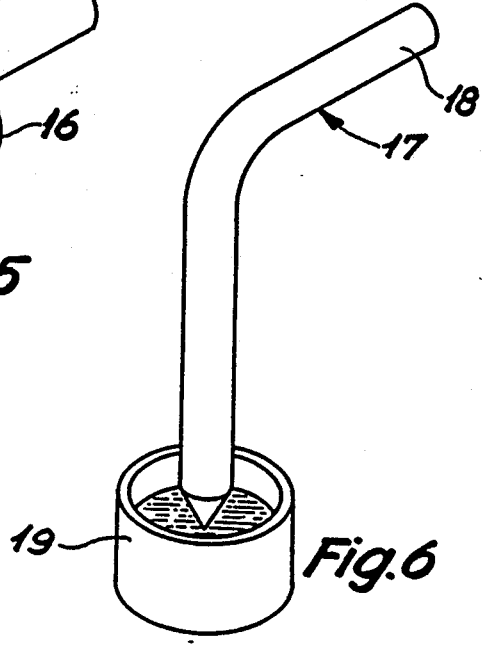

FIG. 6 shows another element for the building set of the invention, said element consisting of a light conductor rod 17, whose one end 18 is adapted to be received and retained in the hole 6 (FIG. 2). In FIG. 6, the light conductor rod 17 is shown in connection with a liquid vessel 19, the reflection conditions at the other end of the light conductor rod being highly dependent upon whether the liquid surrounds the end of the light conductor or is present at a lower level. The liquid level in the vessel 19 may thus be detected by means of the building element of the invention.

FIG. 7 shows an additional reflecting building element for the building set of the invention. The building element in FIG. 7 consists of an element corresponding to FIG. 1, but with line codes 20 on one side of the element. An example of the use of the latter element is schematically shown in FIG. 8, which shows an oblong beam 21 on which three elements 22-24 of the type shown in FIG. 7 are placed. Further, two elements of the invention 25 and 26 are shown, which are optically coupled to the line codes on the blocks 22-24 via light conductor cables 27 and 28, respectively, the optical cables being secured by respective holders 29 and 30, respectively. It is noted that, as previously mentioned, the line codes might consist of depressions in the element if laser light means are used.

The building elements shown in FIG. 8 might conceivably be incorporated e.g. in a model of a car with automatic steering gear comprising the beam 21. The beam 21 may thus be movable in its longitudinal direction with respect to the chassis of the car, while the holders 29 and 30 are stationary with respect to the chassis. The detector elements 25 and 26 may be placed on a stationary or on a movable part of the car because of the flexible light conductor cables 27 and 28. It will thus be appreciated that, through the electric information from the detector elements 25 and 26, positional information may be generated for the steering gear by scanning the line codes present on the building elements 22-24. It will be sufficient with a single detector element 25 which may be connected to a control computer coded to interpret the line code information, but the information may be made more selective by using several detector elements 25, 26. The associated computer may optionally be coded to respond to a pre-determined code pattern, and by mechanically changing the shown line code elements 22-24 or by changing the position of the elements various control characteristics for the constructed model may be provided with the predetermined interpretation in the computer.

Figure 9:
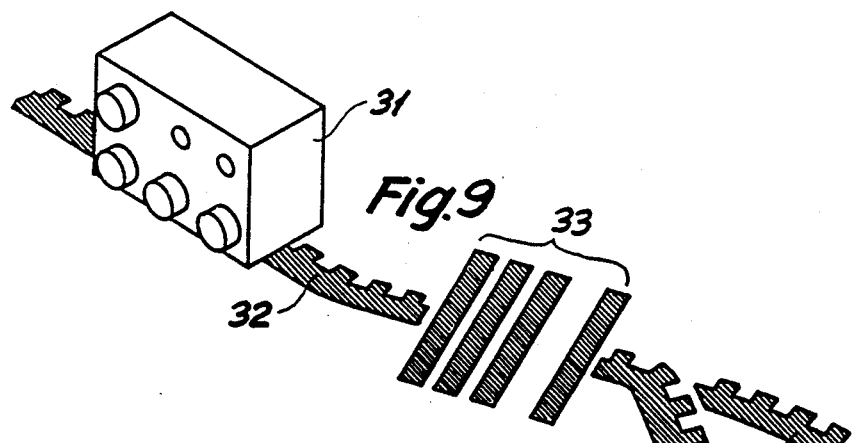

FIG. 9 shows another use of the building set of the invention, and this use may be related to the steering gear for a car model as explained in connection with FIG. 8. The element 31 represents the detector element described previously which is turned so that the light is transmitted downwardly toward a path 32 provided on a line and consisting of a solid line and a broken line closely spaced from each other. Since the element 31 is firmly mounted on the car, it may be detected by means of generally known electronic equipment how the vehicle is positioned with respect to the path 32 on the lane. This information may be used for generating a steering signal to the steering gear, which may be designed as explained in connection with FIG. 8. The code lines 33 across the direction of travel may be placed in order for the steering system to receive information on how far the car as reached along the distance determined by the path 32. Optionally, the code lines 33 may also inform the steering system to steer along another path 34.

It has almost been presupposed in the above explanations that digital signals are generated from the detector element. However, it should be noted that nothing prevents detection of an analog signal, since this is just a matter of the design of the electric circuit detecting the current consumption of the light source.

Figure 11:
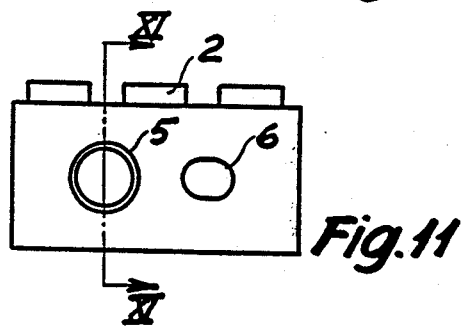
Figure 13:
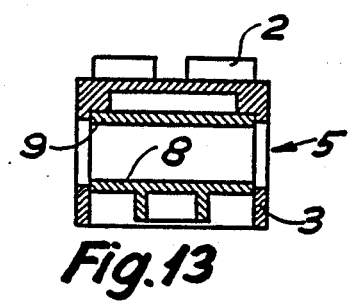
FIG. 13 is a section along the line XI—XI in FIG. 11.
Figure 12:
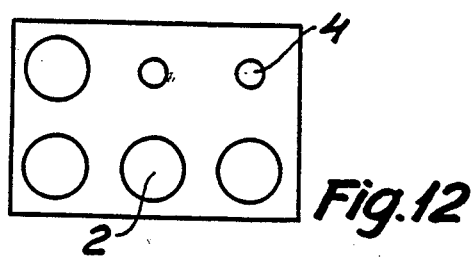

FIGS. 10-13 show some other representations of an embodiment of the detector element of the invention, the figures showing an element seen from below, from the side, from above and in section along the line XI—XI in FIG. 11, respectively. The reference numerals used in connection with FIGS. 2 and 3 are also used in FIGS. 10-13, and it will thus be seen from FIG. 10 that the base of the plate 8 is provided with a pair of coupling tubes 35, 36 which constitute the previously mentioned complementary coupling means for coupling studs on an adjacent alement. FIG. 13 shows some details for the position of the insert 7 in the housing 3, it being seen how the bushing 9 at the top engages some stops within the housing 3. It will be appreciated that the shown embodiment just serves as an example.

We claim:

1. A toy building set with elements featuring projections on one surface engageable with apertures on a surface of another element;
    at least one element for providing positional information by detection of reflected energy, such as light, said one element including both an energy radiating source and an energy receiving detector and including at least one of said projections on one surface and said apertures on another surface which provide means for mechanically coupling said one element with other elements belonging to the building set, a power input means for driving said energy radiating source and a signal output means as a conduit for a signal from said energy receiving detector;
    energy reflecting means; and,
    means for operatively coupling said one element with said energy reflecting means.

2. A toy building set according to claim 1 wherein energy radiating from said source is directional and, characterized by comprising as said energy reflecting means a disc which is journaled transversely to a shaft, said first building element having a through hole to receive the shaft and support the shaft in a direction substantially parallel with the direction at which energy radiates from the source.

3. A toy building set according to claim 2, characterized in that the disc, as seen along a circle around the shaft, has changing reflection properties.

4. A toy building set according to claim 3, characterized in that the disc is provided with radially outwardly extending wind cups.

5. A toy building set according to claim 1, characterized by comprising a light conductor rod whose one end is formed to be received in a hole in the first building element in alignment with the energy radiating source and energy receiving detector of said first building element.

6. A toy building set according to claim 1 or 5 characterized by building elements provided with said mechanical coupling means on a first pair of opposite sides and provided on another side with line codes with changing reflection properties.

7. A toy building set according to claim 1, characterized in that the energy radiating source and the energy receiving detector are adapted to transmit and receive coherent light, respectively.

8. A toy building set according to claims 7 or 3 characterized in that said changing reflection properties are provided by elevations and depressions in a surface of the second building set element.

* * * * *